March 31, 1936.
A. B. SHULTZ
2,035,989
VISCOSITY INDICATING DEVICE
Filed Jan. 23, 1931
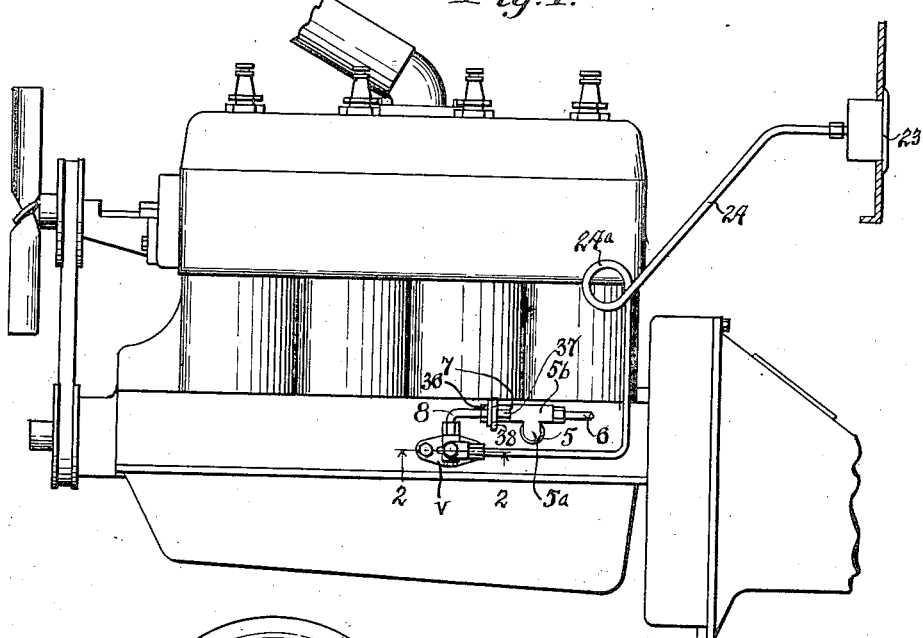
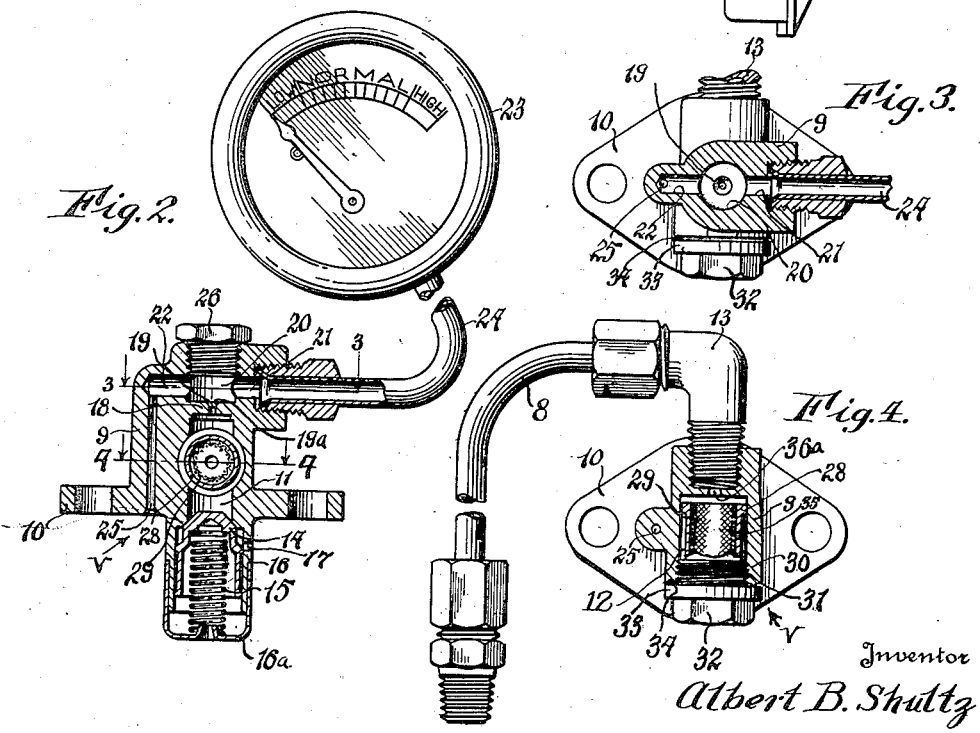
Inventor
Albert B. Shultz
By Popp and Powers
Attorneys Patented Mar. 31, 1936

2,035,989

UNITED STATES PATENT OFFICE 2,035,989

VISCOSITY INDICATING DEVICE

Albert B. Shultz, Buffalo, N. Y.

Application January 28, 1931, Serial No. 511,796

6 Claims. (Cl. 265—11)

This invention relates to improvements in devices for continuously indicating the viscosity condition of a liquid which because of its environment is subject to changes in viscosity. For example the viscosity of the lubricant in the lubricating system of an automobile engine varies because of deterioration and heat. While the range of permissible values of changes in viscosity is substantial, the lubricant after continued use deteriorates to such degree that its modification or replacement is necessary in order to avoid injury to the bearing surfaces. The continuous indication of the viscosity condition of the lubricant is, of course, of advantage in enabling the operator to know when to change or modify the lubricant in order, on the one hand to avoid too frequent changes with resultant waste of lubricant which still may be capable of giving satisfactory service, and on the other hand to avoid continuing to use the lubricant after its deterioration has gone too far.

For the above purposes there has been proposed a device having a metering chamber to which the liquid, the viscosity of which is to be determined, is supplied under constant determined pressure and this chamber communicates respectively with a liquid discharge passage and with a tube leading to a suitable indicator or gauge; the liquid discharge passage imposes a resistance to the flow of the liquid which resistance will vary with the viscosity; during the flow of the liquid a counter pressure is built up which is measured by the indicator or gauge and inasmuch as this counter pressure will vary with variations in the resistance to the flow of the liquid through the discharge passage the readings of the indicator or gauge may be taken in terms of viscosity. I have found that the accuracy of instruments having the features above described is adversely affected by substantial temperature variations to which the liquid may be subject at any moment during its passage through the instrument.

The principal object of the invention is to insure the accuracy and reliability of the operation of such viscosity indicating devices and this object is accomplished by a construction such that the liquid is not and cannot be subject to variations in temperature at any moment during its passage through the instrument; in other words the temperatures to which the liquid is subject during its passage through the instrument are uniform.

A further object is to provide for facility in such cleaning out of the passages through which the liquid flows as may be required from time to time in connection with the removal of sedimentary deposits.

A further object is to promote manufacturing facility and economy.

Devices embodying the features of the invention are particularly adapted for, although by no means necessarily limited to, use in connection with the lubricating system of an internal combustion engine and such use of the invention is herein shown and described by way of example.

In the accompanying drawing:

Figure 1 is a side elevation of an automobile engine equipped with the device in which the features of the invention are incorporated.

Figure 2 is a section along the line 2—2 of Figure 1.

Figure 3 is a transverse section along line 3—3 of Figure 2.

Figure 4 is a transverse section along line 4—4 of Figure 2.

In connection with automobile engines it is the practice to utilize a gauge for indicating the pressure of the lubricant in the lubricating system and for this purpose the latter includes a fitting by which the gauge may be connected in the system, the fitting being secured for convenience upon an outer wall of the engine.

When employed in connection with such a system the apparatus may be conveniently included in the system through the same medium as the pressure gauge, that is to say, by the pressure gauge fitting, although the connection may be made otherwise if desired. The fitting 5, as illustrated in Figure 1, is preferably of a standard T construction, its central leg 5a being suitably connected to the piping of the lubricating system. The arrangement of the piping is not material and hence it is not illustrated. One arm 5b of the fitting is designed for connection with the usual oil pressure gauge (not shown) through the pipe 6 while the other arm is availed of for the connection of the viscosity indicating device in the lubricating system. The arm 7 of the fitting, therefore, is connected to the viscosity indicating device V by a pipe 8.

The device V, as illustrated, comprises a body 9, preferably in the form of a casting which is provided with suitable means for effecting its securement to the engine, for example an attachment flange 10. The body 9 is formed with a central inlet chamber 11 and with a laterally extending passage 12 in communication therewith. The passage 12, and hence the inlet chamber 11, are connected in the lubricating system by the pipe 8, the connection between the latter and the device V being effected by means of a fitting 13.

The bottom of the chamber 11 is provided by a valve 14 which is urged toward the valve seat formed in the body 9 by a suitable spring 15. The valve 14 and spring 15 are mounted in a sleeve-like extension 16 formed with or carried by the body 9, said extension being provided at its outer end with a cap-piece 16a against which the spring 15 bears. The valve 14 is designed to maintain the lubricant in the chamber 11 under a substantially constant pressure. When liquid is supplied to the chamber 11 at such a rate that the pressure would exceed a predetermined value, the valve 14 opens to permit the escape of the excess lubricant, thereby maintaining the pressure constant. The lubricant which flows past the valve 14 escapes through suitable openings 17 formed in the sleeve 16. The body 9 is preferably secured to the engine so that the sleeve 16 extends through a wall thereof and hence the excess lubricant passes directly back into the crank case. At the inner end of the chamber 11 the body 9 is provided with a web 18 which forms a partition between said chamber and a metering chamber 20. The partition 18 is formed with a central orifice 19 through which the liquid flows from the inlet chamber to the metering chamber. The orifice 19 is flared at its discharge end, as at 19a, in order to minimize its clogging by any solid particles which may be carried by the lubricant.

The metering chamber 20 is provided with two laterally extending passages 21 and 22, the former being in communication with a pressure gauge 23 by means of a pipe 24 and the latter being in communication with a passage 25. The liquid discharges through the passage 25 which, however, is especially designed to offer resistance to the flow of the lubricant in accordance with its viscosity so that a back, or counter, pressure is set up.

In the arrangement disclosed the passage 25 communicates with a suitable orifice (not shown) in the crank case whereby the liquid escaping from said passage is returned directly to the crank case along with the liquid escaping through the orifices 17. The metering chamber 20 is closed by a threaded plug 26 which is directly over the orifice 19, the purpose of the plug being to provide ready access to the orifice for the purpose of clearing the same should it become obstructed by any deposited solid matters.

It will be noted that the resistance passage 25 is incorporated directly in the body 9 whereby its walls will be of the same temperature throughout their extent and will be at the temperature which prevails throughout said body. Where the latter, as is preferred, is connected to the crank case the temperature prevailing in the body 9 is substantially "crank case temperature" and is the temperature to which the liquid flowing through said body is uniformly subjected.

The diameter of the orifice 19, as shown and preferred, is less than that of the resistance passage 25. Hence any solid matter which may pass through the orifice will, in most cases, readily pass through the resistance passage.

It is preferable that the liquid be filtered or strained prior to its flow into the metering chamber 20. According to the invention the filter is removably mounted in the inlet chamber 11 in such relation that the liquid must first pass through the filter mesh. A filter casing 28 which is arranged in the chamber 12 carries a cylindrical section of filter or screen mesh 29, the casing 28 and mesh filter 29 being in axial communication with the inlet orifice of the passage 12. At its end remote from the passage 12 the casing 28 is permanently closed. The casing 28 is removably fitted within and athwart the chamber 11 and is, therefore, formed with external threads 30 for engagement in a threaded opening 31 formed in the casting 9. Beyond said casting the casing 28 is provided with an integral externally accessible nut 32 and between the nut and the threads 30 with a sealing flange 33 which engages tightly against an annular sealing seat 34 formed on the outer face of the casting 9 concentrically with the opening 31. The casing 28 is formed in its side with a discharge orifice 35 through which the liquid after passing through the filter mesh flows into the inlet chamber 11. Whenever the filter mesh may need cleaning or replacement all that is required is to remove the casing 28 by unscrewing it from the body 9, complete access to the filtering mesh being thus afforded. It is to be noted that when the casing 28 is thus removed the interior of the chamber is completely accessible in case any cleaning thereof should be required. The metering chamber 20 is likewise completely accessible for cleaning upon the removal of its closure plug 26. All parts of the casting and of the filter mesh are thus quickly and easily made accessible for cleaning without the necessity of taking down, disconnecting or in any way disturbing the piping of the system or the connections by which the casting is supported.

In order to avoid the diversion of too great a quantity of lubricant from the main lubricating system with resultant undesirable decrease of the pressure in such system, the pipe 8 is connected to the arm 7 through fittings 36 and 37 and clamping nut 38. The body 9 is formed with a restricted orifice 36a to control or limit the quantity of lubricant entering the pipe 8.

The device may, of course, be mounted in any position desired. It is preferred, however, that it be mounted as close to the fitting 5 as convenience permits in order that the lubricant in passing through the pipe 8 will not be cooled to an appreciable extent, thereby insuring the testing of the lubricant as to its viscosity condition at substantially the same temperature as exists in the crank case. The supply pipe 8 may, if desired, be provided with a heat insulating covering in order to avoid radiation losses. This is desirable when the supply pipe may be of such length that there is a possibility of the lubricant being cooled to an appreciable extent.

It is the practice to cause the lubricant in the lubricating system to circulate under a pressure great enough to force the lubricant to all surfaces requiring lubrication, this being accomplished by a suitable pump. The device V being connected in the lubricating system, it follows that lubricant is supplied by the pipe 8 to the inlet chamber 11, the valve 14 preventing the pressure in the chamber from exceeding a predetermined value. The lubricant in the chamber 11, therefore, is forced through the orifice 19 under a substantially constant head or pressure. The resistance to the flow of the lubricant through the orifice does not vary to any appreciable extent with variations in viscosity of the lubricant. Hence, the latter will flow into the metering chamber 20 at a substantially uniform rate. The resistance offered to the flow of the lubricant through the passage 25, however, varies in accordance with the viscosity of the lubricant, and, the pressure remaining constant, the rate of flow of the lubricant through the passage varies as the viscosity of the lubricant. As the rate of flow of the lubricant varies, there is a corresponding variation in the pressure in the metering chamber and this pressure corresponds to the viscosity of the lubricant. Thus, by translating pressure units into viscosity units the viscosity of the lubricant may be determined. The pressure gauge 23, therefore, is provided with a dial divided into viscosity units. The pipe 24 which leads from the auxiliary chamber 20 to the gauge is preferably formed with a loop 24a to enable relative movement between the engine, hence the device, and the instrument panel of the automobile.

The dial of the pressure gauge 23 may be provided with any convenient scale. As illustrated, the scale is divided into three main divisions which are designated as "Low", "Normal", and "High", these representing low, normal, and high viscosities respectively. The "Low" division preferably indicates a viscosity of from 0 to 50 Saybolt seconds, the "Normal" division from 50 to 900 Saybolt seconds and the "High" division from 900 to 1500 Saybolt seconds. The "Normal" division may also, as illustrated, be subdivided. When the hand of the gauge is within the limits of the "Normal" range, the observer is advised that the oil is of a viscosity which is adequate. However, if the hand is in the "Low" division, the observer is warned that the viscosity of the lubricant is inadequate and should either be built up by the addition of a more viscous lubricant or it should be replaced. When the hand is in the "High" division the observer is warned that the lubricant is too viscous to penetrate to the surfaces which should be lubricated and its viscosity should be reduced by the addition of a liquid of less viscosity. The lubricant which passes through the resistance passage flows back into the crank case for re-use.

Owing to the resistance passage 25 being incorporated in the casting 9 whereby the walls of said passage are of uniform temperature throughout their extent and have substantially the same temperature as the casting there are no inequalities of radiation loss or other temperature interferences with the viscosity of the liquid flowing through said passage. Therefore the liquid at all points in said passage is of the same or substantially the same temperature and viscosity as elsewhere in the casting 9. It follows that the counter pressures which influence the indicator 23 truly correspond to the viscosity of the liquid as delivered to the instrument at the passage 12 and hence that the readings of the indicator 23 are accurate indications of the actual viscosity of the lubricant.

The device V is compact in construction and may be formed economically as a casting. This has the advantage that it may be secured against the crank case so as to be heated to substantially the same degree as the latter, whereby the lubricant in the device is tested at substantially the same temperature as the lubricant in the crank case. This insures an accurate viscosity reading despite the fact that the device is not located in the crank case of the engine.

I claim as my invention:

1. A device for indicating the viscosity of a liquid in a system in which the liquid is caused to flow including a body provided with an inlet chamber to which liquid is delivered from said system and in which it is maintained under a substantially constant pressure, a metering chamber, and a partition separating said chambers and formed with an orifice through which liquid may flow from the inlet chamber into the metering chamber, said body having in one of its walls an externally accessible removable closure element through which access may be had to said orifice for clearing the same, the said body also including a discharge passage for the liquid adapted to create a resistance to the flow proportionate to the viscosity of the liquid, such resistance setting up a counter pressure in the metering chamber and an indicator connected to said metering chamber and responsive to such counter pressure.

2. A device for indicating the viscosity of a liquid in a system in which the liquid is caused to flow including a body adapted to have a substantially uniform temperature throughout its extent and provided with an inlet chamber to which liquid is delivered from said system and in which it is maintained under a substantially constant pressure, a metering chamber, and a partition separating said chambers and formed with an orifice through which the liquid may flow from the inlet chamber into the metering chamber, said body having incorporated therein a passage extending from the metering chamber and through which the liquid is discharged, said passage being formed to impose a resistance to the flow of the liquid proportionate to the viscosity of the liquid, the body being of a material such that the walls of said passage have a temperature substantially uniform throughout their extent and uniform with the temperature of the body, the metering chamber having in one of its walls an externally accessible removable closure element by which access may be had to said chamber to clean the same and said orifice, the resistance developed in said passage setting up a counter pressure in said metering chamber and an indicator connected to said metering chamber and responsive to such counter pressure.

3. A device for indicating the viscosity of a liquid in a system in which the liquid is caused to flow including a body provided with an inlet chamber to which liquid is delivered from said system in which it is maintained under a substantially constant pressure, a metering chamber, a partition separating said chambers and formed with an orifice through which liquid may flow from the inlet chamber into the metering chamber, the inlet chamber having an opening in one of its walls, a removable element normally closing said opening, and removable filtering means held in position by said element and through which the liquid passes before entering said metering chamber, the said body including a discharge passage for the liquid adapted to create a resistance to the flow proportionate to the viscosity of the liquid, such resistance setting up a counter pressure in the metering chamber, and an indicator connected to said metering chamber and responsive to such counter pressure.

4. A device for indicating the viscosity of a liquid in a system in which the liquid is caused to flow including a body provided with an inlet chamber to which liquid is delivered from said system and in which it is maintained under a substantially constant pressure, a metering chamber, a partition separating said chambers and formed with an orifice through which liquid may flow from the inlet chamber into the metering chamber, the inlet chamber having an opening in one of its walls, a removable element normally closing said opening, and removable filtering means held in position by said element and through which the liquid passes before entering said metering chamber, the latter having in one of its walls an externally accessible removable closure element through which access may be had to the metering chamber and to said orifice for cleaning the same, the said body also including a discharge passage for the liquid adapted to create a resistance to the flow proportionate to the viscosity of the liquid, such resistance setting up a counter pressure in the metering chamber, and an indicator connected to said metering chamber and responsive to such counter pressure.

5. A device for indicating the viscosity of a liquid in a system in which the liquid is caused to flow including a body adapted to have a substantially uniform temperature throughout its extent and provided with an inlet chamber to which liquid is delivered from said system and in which it is maintained under a substantially constant pressure, a metering chamber, a partition separating said chambers and formed with an orifice through which the liquid may flow from the inlet chamber into the metering chamber, said body having incorporated therein a passage extending from the metering chamber and through which the liquid is discharged, said passage being formed to impose a resistance to the flow of the liquid proportionate to the viscosity of the liquid, the body being of a material such that the walls of said passage have a temperature substantially uniform throughout their extent and substantially uniform with the temperature of the body, the inlet chamber having an opening in one of its walls, a removable element normally closing said opening, and removable filtering means held in position by said element and through which the liquid passes before entering said metering chamber, the latter having in one of its walls an externally accessible removable closure element by which access may be had to said chamber to clean the same and said orifice, the resistance developed in said passage setting up a counter pressure in said metering chamber and an indicator connected to said metering chamber and responsive to such counter pressure.

6. A device for indicating the viscosity of a liquid in a system in which the liquid is caused to flow including a body provided with an inlet chamber to which liquid is delivered from said system and in which it is maintained under a substantially constant pressure, a metering chamber, a partition separating said chamber and formed with an orifice through which the liquid may flow from the inlet chamber to the metering chamber, removable filtering means normally confined in the inlet chamber and through which the liquid passes before entering said metering chamber, a relatively removable part associated with said inlet chamber upon the removal of which access is had to said filtering means, the said body including a discharge passage for the liquid adapted to create a resistance to the flow proportionate to the viscosity of the liquid, such resistance setting up a counter pressure in the metering chamber, and an indicator connected to said metering chamber and responsive to such counter pressure.

ALBERT B. SHULTZ.